(12) United States Patent
Hongpeng et al.

(10) Patent No.: US 9,908,762 B1
(45) Date of Patent: Mar. 6, 2018

(54) PALLET TRUCK LOAD LIFT PORTION

(71) Applicant: Big Lift, LLC, Lombard, IL (US)

(72) Inventors: Xu Hongpeng, Hangzhou (CN); Xu Linjie, Hangzhou (CN); Xu Minghui, Hangzhou (CN)

(73) Assignee: BIG LIFT, LLC, Lombard, IL (US)

(*) Notice: Subject to any disclaimer, the term of this patent is extended or adjusted under 35 U.S.C. 154(b) by 0 days.

(21) Appl. No.: 15/337,055

(22) Filed: Oct. 28, 2016

(30) Foreign Application Priority Data

Oct. 14, 2016 (CN) .......................... 2016 1 0896525

(51) Int. Cl.
*B66C 3/00* (2006.01)
*B66F 9/12* (2006.01)
*B66F 9/075* (2006.01)

(52) U.S. Cl.
CPC ............ *B66F 9/12* (2013.01); *B66F 9/07531* (2013.01)

(58) Field of Classification Search
CPC ....................................................... B66F 9/12

USPC .......................................................... 414/785
See application file for complete search history.

(56) References Cited

U.S. PATENT DOCUMENTS

| | | | | |
|---|---|---|---|---|
| 2004/0191047 | A1* | 9/2004 | Meijer ...................... | B60P 1/52 414/785 |
| 2008/0175700 | A1* | 7/2008 | McGrane .................. | B66F 9/12 414/607 |
| 2009/0297320 | A1* | 12/2009 | Daraie ................. | A01D 87/127 414/785 |

* cited by examiner

*Primary Examiner* — Saul Rodriguez
*Assistant Examiner* — Willie Berry, Jr.
(74) *Attorney, Agent, or Firm* — Cook Alex Ltd.

(57) ABSTRACT

The disclosure provides a pallet truck load lift portion, including a fork frame, a roof plate, and two upright columns. Each of the two upright columns includes two column plates and a column connection plate extending between and connected to the two column plates. This provides a simple but high strength structure, and an open and accessible space between the fork frame and upright columns that can be used for positioning a battery or other components.

17 Claims, 7 Drawing Sheets

PALLET TRUCK LOAD LIFT PORTION

CROSS-REFERENCE TO RELATED APPLICATION

This application claims priority to Chinese Patent Application No. 201610896525.7, filed Oct. 14, 2016, the disclosure of which is hereby incorporated by reference in its entirety.

TECHNICAL FIELD

The invention relates to pallet trucks for material handling, including a pallet truck load lift portion having a fork frame, a roof plate, and two upright columns connected to the fork frame and roof plate, which provides a simple but high strength structure.

BACKGROUND

There is widespread use of pallet trucks in various industries. Users have an ongoing tendency to request higher pallet truck performance standards, such as for higher load requirements. Traditional pallet trucks typically feature a load lift portion having an upright frame that may be generally triangle-shaped or box-shaped and formed of steel, such steel plate having a thickness of 5 mm-6 mm. The steel plate structure may provide a front face plate that is connected to side portions to form a more stable structure that also serves to connect a fork frame at a lower portion to a roof plate or other lift cylinder connection member at an upper portion. The steel plate structure includes large planar portions that generally are sealed to the front and sides, and may be complicated to manufacture, requiring substantial material and welding. To try to save cost and/or weight, a manufacturer may seek to use thinner plate, but because the material is load bearing when lifting and supporting loads, this may result in deformation in the high stress areas or upon impact.

Summary

The subject matter of this disclosure provides advantages over the load lift portions of typical prior art pallet trucks. The intention is to provide pallet truck load lift portions that are easy to manufacture, of high strength, low waste and low cost.

In a first aspect, the disclosure provides a pallet truck load lift portion having a fork frame, two upright columns and a roof plate. The two upright columns are connected to the fork frame and to the roof plate. The two upright columns are of simple, low cost and low waste construction, while contributing to a high strength load lift portion. The two column structure also provides a space between the fork frame, two upright columns and roof plate that can be utilized for locating other components, such as a battery. Each of the two upright columns includes two column plates and a column connection plate welded to and between the two column plates.

It is to be understood that both the foregoing general description and the following detailed description are exemplary and provided for purposes of explanation only, and are not restrictive with respect to the claimed subject matter. Further features and advantages will become more fully apparent in the following description of the example preferred embodiment and from the appended claims.

BRIEF DESCRIPTION OF THE DRAWINGS

In describing the preferred example, references are made to the accompanying drawing figures wherein like parts have like reference numerals. For ease of viewing and comprehension, several of the figures show less than an entire battery system or show only particular components of the system.

It should be understood that the drawings are not necessarily to scale. While some mechanical details of pallet truck load lift portion have been omitted, including some details of fastening or connecting means and other plan and section views of the particular components, such details are considered to be within the comprehension of those skilled in the art in light of the present disclosure. It also should be understood that the present disclosure is not limited to the examples illustrated and described.

DETAILED DESCRIPTION OF THE PREFERRED EMBODIMENT

This disclosure provides solutions to the technical problems presented by prior art pallet truck load lift portions that tend to use large planar metal plates to construct an upright frame structure that connects a fork frame and a roof plate or other lift cylinder connection members.

Figure 1:
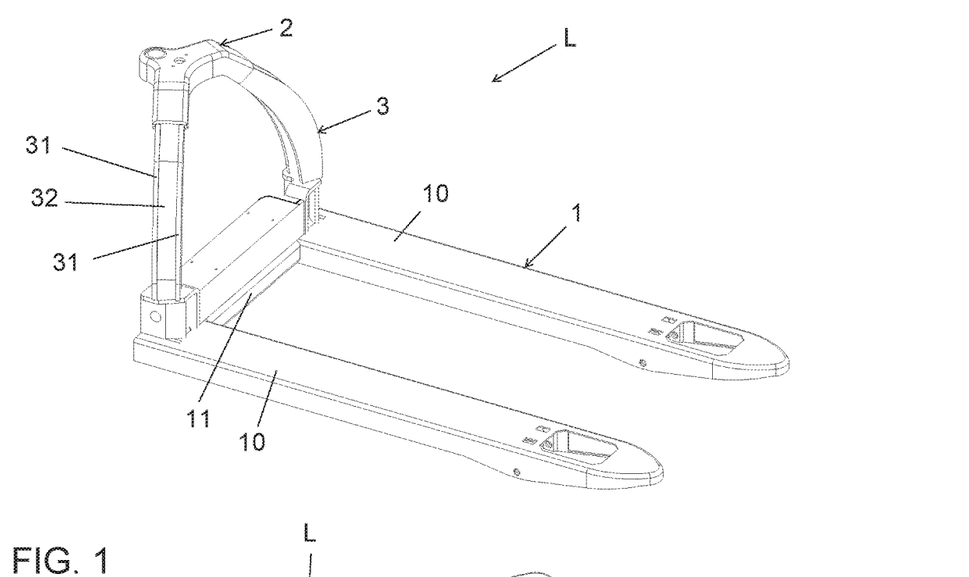
FIG. 1 provides front right and rear right perspective views of an example pallet truck load lift portion.
Figure 2:
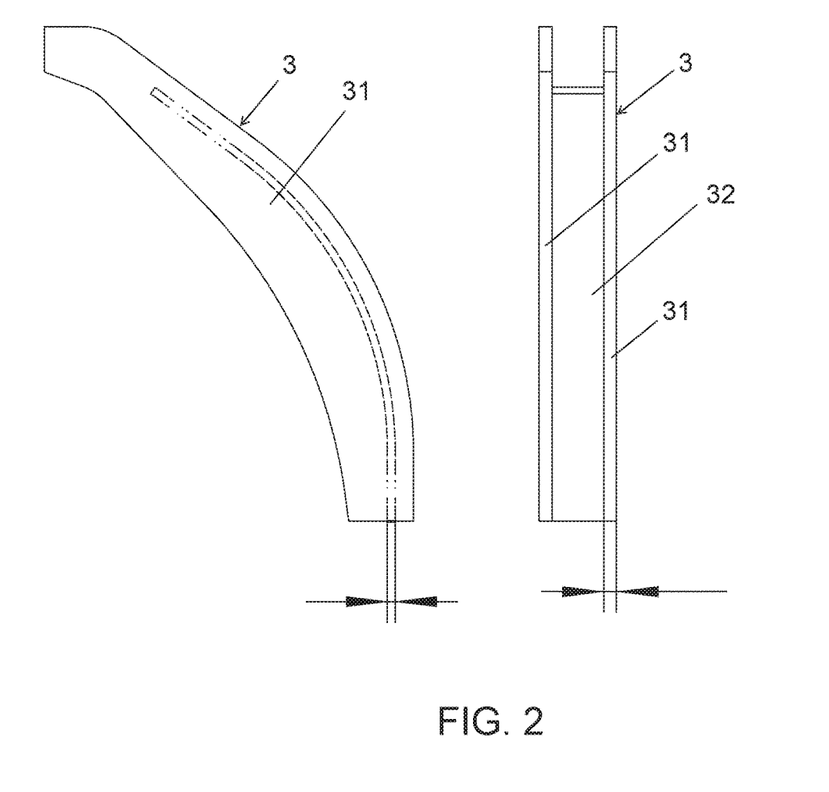
FIG. 2 provides a front view and a side view of a column structure shown in FIG. 1.
Figure 3:
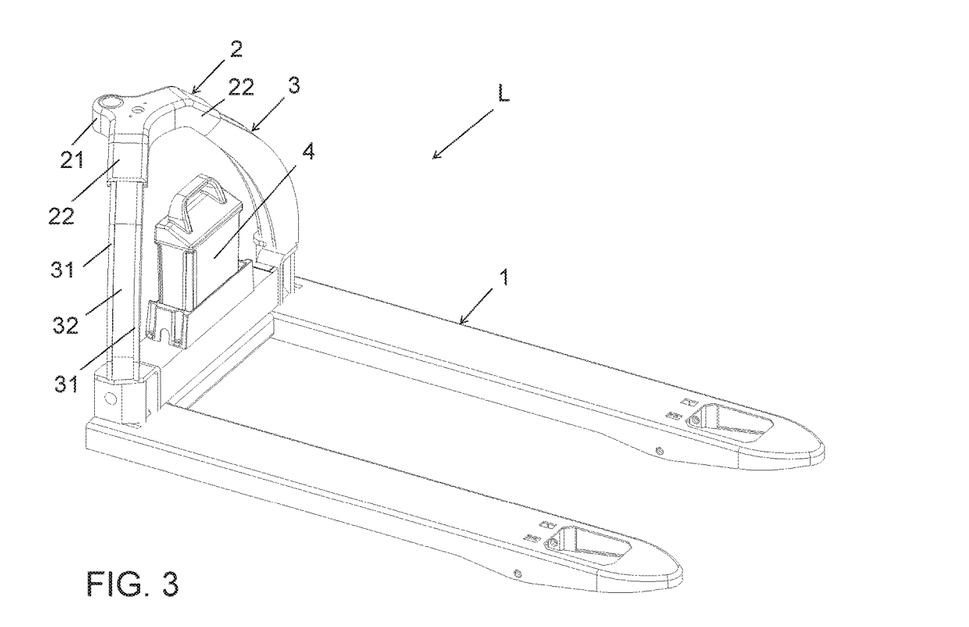
FIG. 3 provides front right and rear right perspective views of the example pallet truck load lift portion shown in FIG. 1 and with a battery and battery base shown located between the columns and below the roof plate.

An example pallet truck load lift portion L is shown in FIGS. 1-3. The example load lift portion L includes a fork frame 1, a roof plate 2, and two upright columns 3 that extend between and are connected to the fork frame 1 and roof plate 2. The fork frame 1 includes fork members 10 that extend forward from a rear portion 11, with the rear portion 11 extending between and being connected to the fork members 10. The roof plate 2 has a rear portion 21 configured to be connected to a load lift cylinder, and two outward extensions 22 configured for connection to the two upright columns 3. Each of the upright columns 3 includes two column plates 31 and a column connection plate 32 which extends between and is connected to the two column plates 31. In a preferred example, the two column plates may be constructed of steel plate having a thickness of 10 mm, while the column connection plate 32 may be constructed of steel plate having a thickness of 6 mm. The selection of materials and thickness may vary, depending on the selected design constraints.

In the example shown, the preferred means of connecting the components within the load lift portion L is by welding.

Thus, it is preferred that the column connection plate 32 is welded at each side to a column plate 31, and each outward extension 22 of the roof plate 2 is welded to an upright column 3 at an upper end of the upright column 3 and is welded to a fork member 10 at the lower end of the upright column 3. It will be appreciated that other means of connecting components may be utilized if desired, such as by use of fasteners, or the like. This construction results in an arch structure that is formed by the roof plate 2 and upright columns 3, and causes the two upright columns 3 to tend to deflect inward when under a lifting load, which helps to concentrate the stress on the rigid upright columns 3. It will be appreciated that within the combined arch structure, each connection plate 32 has a length and is curved over its length. Also, the unique construction may provide for a shorter pallet truck length by shortening the length or space needed for the upright frame structure.

Figure 4:
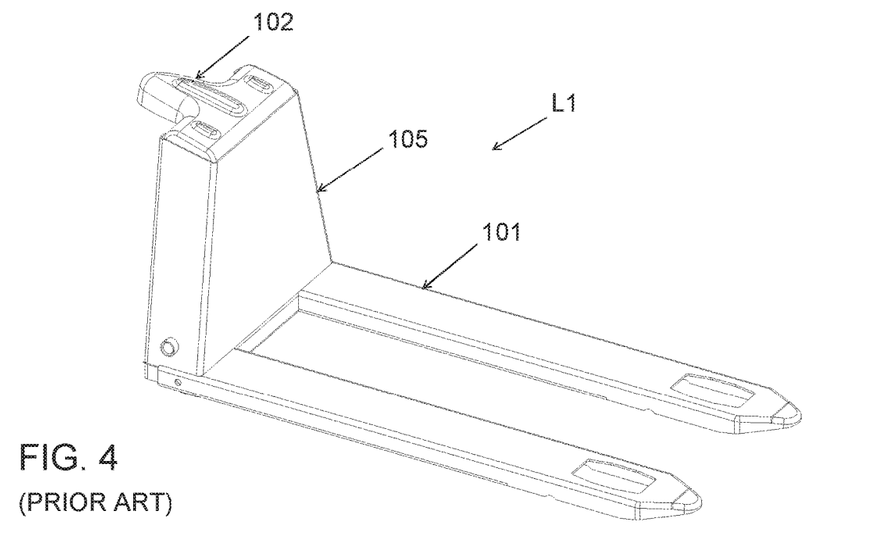
FIG. 4 provides a first example prior art pallet truck load lift portion having a generally triangle-shaped upright frame structure.

A brief review of a few prior art structures helps to appreciate the advantages of the new pallet truck load lift portion shown in FIGS. 1-3. For instance, FIG. 4 shows a first example of a prior art pallet truck load lift portion L1 for an electrically powered pallet truck having a generally triangle-shaped or tapered upright frame structure 105. The upright frame structure 105 is formed by welding together large sections of steel plate, which far exceeds the steel plate used in the above example pallet truck load lift portion L. The upright frame structure 105 is connected at its upper end to a roof plate 102 and at its lower end to a fork frame 101. The large front panel of the upright frame structure 105 may require additional support, such as gusset 106, and while a battery 104 (represented in broken lines) may be positioned within the upright frame structure 105, the battery 104 would not be accessible from the front of the pallet truck load lift portion L1.

Figure 5:
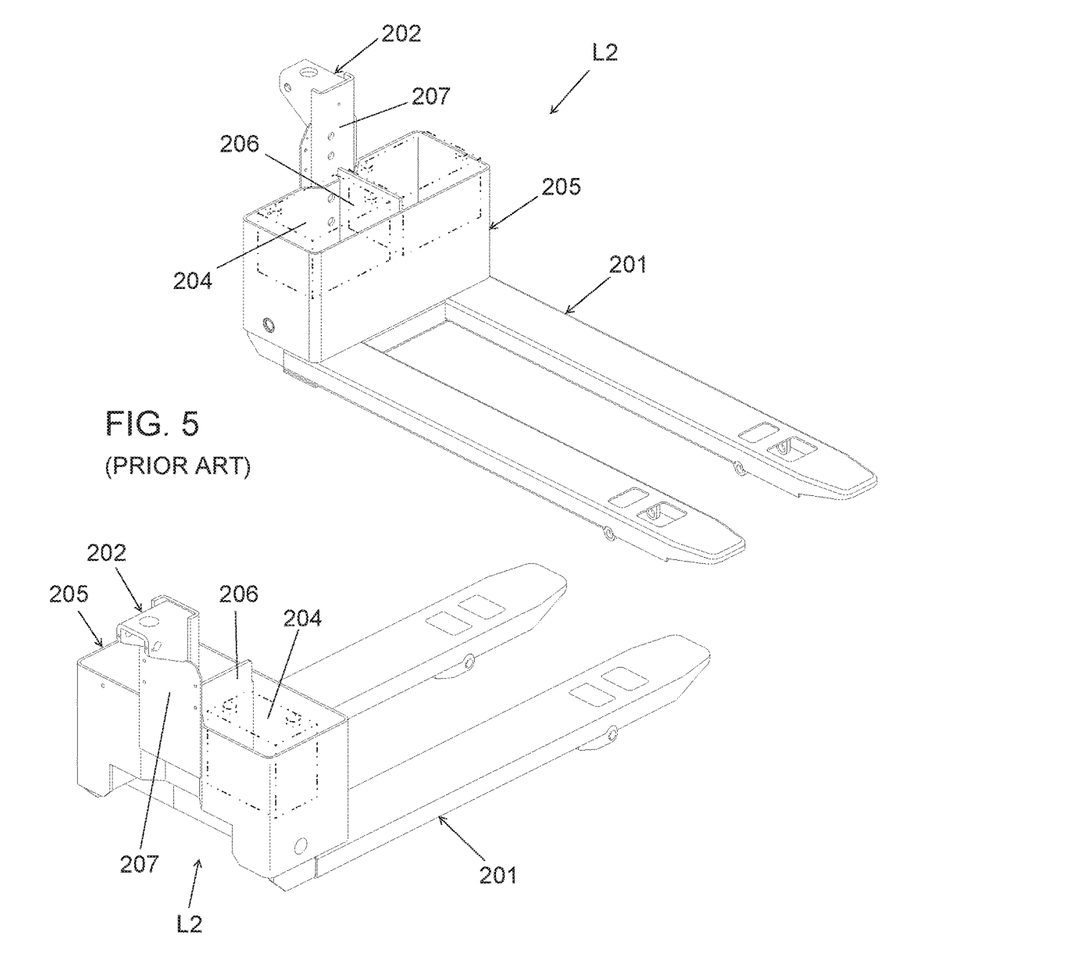
FIG. 5 provides a second example prior art pallet truck load lift portion having a generally box-shaped upright frame structure.

A second prior art pallet truck load lift portion L2 is shown in FIG. 5. This second prior art example also is for an electrically powered pallet truck, but it has a generally box-shaped upright frame structure 205. The upright frame structure 205 is formed by welding together large sections of steel plate to form a box shape, which far exceeds the steel plate used in the above example pallet truck load lift portion L. The upright frame structure 205 is coupled at its upper end to a roof plate 202 by an upright member 207 and is connected at its lower end to a fork frame 201. The large front panel of the upright frame structure 205 may require additional support, such as inner wall 206, and while a battery 204 (represented in broken lines) may be positioned within the upright frame structure 205, the battery 204 would not be accessible from the front or rear of the pallet truck load lift portion L2.

Figure 6:
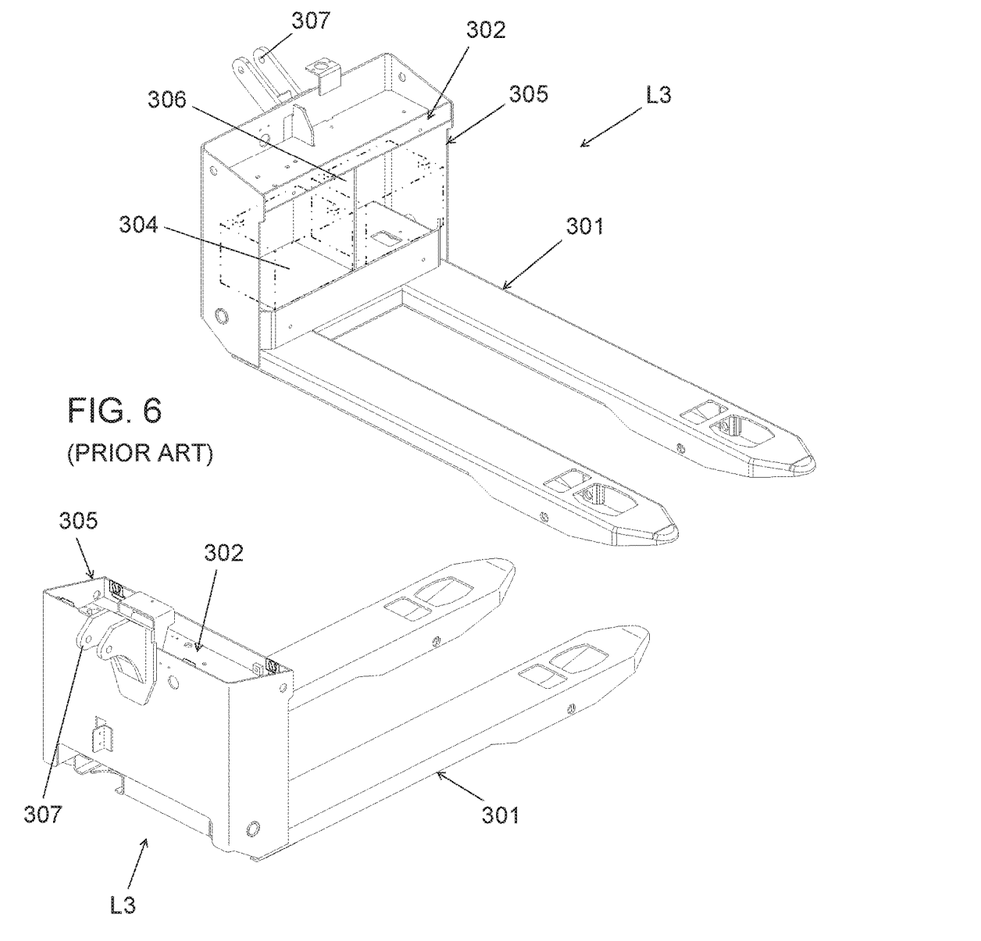
FIG. 6 provides a third example prior art pallet truck load lift portion having a generally box-shaped upright frame structure.

A third prior art pallet truck load lift portion L3 is shown in FIG. 6. This third prior art example also is for an electrically powered pallet truck, but it has a generally box-shaped upright frame structure 305. The upright frame structure 305 is formed by welding together large sections of steel plate to form a box shape, which far exceeds the steel plate used in the above example pallet truck load lift portion L. The upright frame structure 305 is connected at its upper end to a roof plate 302 and includes lift cylinder mounting members 307 extending upward and rearward therefrom, and is connected at its lower end to a fork frame 301. The upright frame structure 305 may require additional support, such as inner wall 306, and while a battery 304 (represented in broken lines) may be positioned within the upright frame structure 305, the battery 304 typically would be covered by a front panel (not shown) and would not be accessible from the rear of the pallet truck load lift portion L3.

Figure 7:
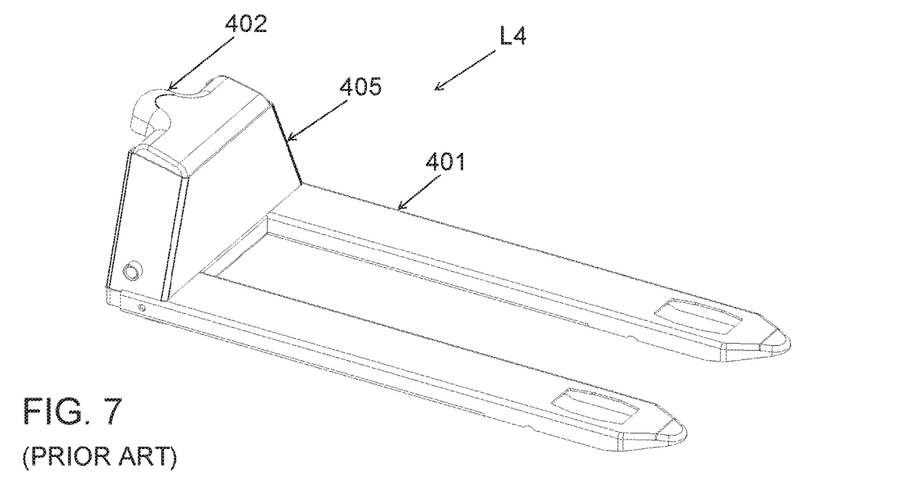
FIG. 7 provides a fourth example prior art pallet truck load lift portion having a generally triangle-shaped upright frame structure.

A fourth prior art pallet truck load lift portion L4 is shown in FIG. 7. This fourth prior art example is for a manually operated pallet truck having a generally triangle-shaped or tapered upright frame structure 405. The upright frame structure 405 is formed by welding together large sections of steel plate, which far exceeds the steel plate used in the above example pallet truck load lift portion L. The upright frame structure 405 is connected at its upper end to a roof plate 402 and at its lower end to a fork frame 401. While a battery or other components (not shown) may be positioned within the upright frame structure 405, such components would not be accessible from the front of the pallet truck load lift portion L4.

Indeed, a review of the four example prior art pallet truck load lift portions L1, L2, L3, and L4, highlights the advantages of the new pallet truck load lift portion L that is shown in FIGS. 1-3. For instance, one can appreciate that the new structure may have a shorter length than the prior art pallet truck load lift portions, provides a high strength assembly having more open and accessible interior space, and avoids difficult manufacturing processes, material waste and easy deformation. The much smaller pieces of plate used to construct the two upright columns 3 should result in less complex manufacturing, and lower cost and material waste. Also, the open and accessible space between the spaced apart two upright columns 3 may provide a receiving area therebetween, which simplifies the structure and permits better space utilization, such as by placement of the battery 4 in an open and accessible position, as may be seen in FIG. 3. It will be understood that such open space also could be configured to receive alternative or additional components, as desired.

Thus, the present disclosure presents alternatives to prior art load lift portions for pallet trucks. The pallet truck load lift portion provides advantageous features by permitting simplified and more efficient manufacturing, while permitting more efficient space management and accessibility to components that may be positioned in the area between the upright columns. This provides a solution that features, low cost and low waste, while significantly improving utility and efficiency of a pallet truck, whether of the manual or electrically operated type.

It will be appreciated that the present disclosure shows and demonstrates a preferred example pallet truck load lift portion. However, the example is merely illustrative and is not to be considered limiting. It will be apparent to those of ordinary skill in the art that the pallet truck load lift portion may be constructed and configured for use in various pallet trucks, without departing from the scope or spirit of the present disclosure. Thus, although an example has been described herein for use in an electrically operated pallet truck, the scope of coverage of this patent is not limited thereto. On the contrary, this patent covers all methods, apparatus and articles of manufacture fairly falling within the scope of the appended claims either literally or under the doctrine of equivalents.

The invention claimed is:
1. A pallet truck load lift portion, comprising:
   a fork frame; two upright columns and a roof plate;
   wherein the fork frame has at least two forks laterally spaced apart and being fixedly connected to a rear portion;
   wherein each of the two upright columns has a lower end, an upper end and an upright length, with each of the two upright columns being curved over the upright length and extending rearward from the forks;

wherein the lower ends of the two upright columns are connected to the fork frame and are laterally spaced apart a first distance, and the upper ends of the two upright columns are connected to the roof plate and are laterally spaced apart a second distance, with the second distance being less than the first distance, and wherein the roof plate and two upright columns form an arch structure; and wherein the roof plate extends rearward relative to the at least two forks and relative to the lower ends of the two upright columns, and the roof plate has a rear portion configured to be connected to a load lift cylinder.

2. The pallet truck load lift portion of claim 1, wherein each of the two upright columns includes two column plates that are spaced apart and parallel to each other, and a connection plate that is located between and connected to each of the two column plates.

3. The pallet truck load lift portion of claim 2, wherein each column plate is thicker than each connection plate.

4. The pallet truck load lift portion of claim 2, wherein the column connection plate is welded to the two column plates.

5. The pallet truck load lift portion of claim 1, wherein each of the two upright columns is welded at an upper end to the roof plate and is welded at a lower end to the fork frame.

6. The pallet truck load lift portion of claim 1, wherein the spaced apart two upright columns form a receiving area therebetween.

7. The pallet truck load lift portion of claim 1, wherein the roof plate has two outward extensions configured for connection to the two upright columns.

8. The pallet truck load lift portion of claim 1, wherein the two upright columns tend to deflect inward toward each other when under a lifting load.

9. A pallet truck load lift portion, comprising:
a fork frame; two upright columns and a roof plate;
wherein the fork frame has at least two forks laterally spaced apart and being fixedly connected to a rear portion;
wherein each of the two upright columns has a lower end and an upper end and further comprises two column plates that are spaced apart and parallel to each other, and a connection plate that is located between and connected to each of the two column plates;

wherein the lower ends of the two upright columns are fixedly connected to the fork frame and are laterally spaced apart a first distance, the two upright columns extend rearward from the forks, and the upper ends of the two upright columns are fixedly connected to the roof plate extend toward each other and are laterally spaced apart a second distance, with the second distance being less than the first distance; and wherein the roof plate extends rearward relative to the at least two forks and relative to the lower ends of the two upright columns, and the roof plate has a rear portion configured to be connected to a load lift cylinder.

10. The pallet truck load lift portion of claim 9, wherein each column plate is thicker than each connection plate.

11. The pallet truck load lift portion of claim 9, wherein the column connection plate is welded to the two column plates.

12. The pallet truck load lift portion of claim 9, wherein each of the two upright columns is welded at an upper end to the roof plate and is welded at a lower end to the fork frame.

13. The pallet truck load lift portion claim 9, further comprising the two upright columns being spaced apart and forming a receiving area therebetween.

14. The pallet truck load lift portion of claim 9, wherein the roof plate has two outward extensions configured for connection to the two upright columns.

15. The pallet truck load lift portion of claim 9, wherein the connected roof plate and two upright columns form an arch structure.

16. The pallet truck load lift portion of claim 9, wherein the two upright columns tend to deflect inward when under a lifting load.

17. The pallet truck load lift portion of claim 9, wherein each connection plate has a length and is curved over its length.

* * * * *